US012700266B2

(12) United States Patent
Mikami

(10) Patent No.: US 12,700,266 B2
(45) Date of Patent: Aug. 4, 2026

(54) CONTROL SYSTEM AND CONTROL METHOD FOR UNMANNED VEHICLE

(71) Applicant: TOYOTA JIDOSHA KABUSHIKI KAISHA, Toyota (JP)

(72) Inventor: Yasuyuki Mikami, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/764,549

(22) Filed: Jul. 5, 2024

(65) Prior Publication Data

US 2025/0140028 A1 May 1, 2025

(30) Foreign Application Priority Data

Oct. 26, 2023 (JP) ................................. 2023-184149

(51) Int. Cl.
*G07C 5/00* (2006.01)
*G06V 20/59* (2022.01)

(52) U.S. Cl.
CPC ............. *G07C 5/006* (2013.01); *G06V 20/59* (2022.01); *G07C 5/008* (2013.01)

(58) Field of Classification Search
CPC ......... G07C 5/006; G07C 5/008; G06V 20/59
See application file for complete search history.

(56) References Cited

U.S. PATENT DOCUMENTS

| | | | |
|---|---|---|---|
| 10,866,106 B2 | 12/2020 | Arakawa | |
| 10,991,176 B2 | 4/2021 | Yoshizaki et al. | |
| 10,991,254 B2 | 4/2021 | Hayashi et al. | |
| 11,048,263 B2 | 6/2021 | Urano | |
| 11,052,780 B2 | 7/2021 | Taguchi et al. | |
| 11,281,215 B2 | 3/2022 | Yoshizaki et al. | |
| 2019/0128694 A1 | 5/2019 | Matsushita et al. | |
| 2019/0129438 A1 | 5/2019 | Morita et al. | |
| 2019/0137999 A1 | 5/2019 | Taguchi et al. | |
| 2020/0189610 A1 | 6/2020 | Sakai et al. | |
| 2020/0324788 A1 | 10/2020 | Ando | |
| 2021/0114600 A1 | 4/2021 | Uno | |
| 2024/0317259 A1* | 9/2024 | Johanna ............ B60W 60/0013 |
| 2024/0326848 A1* | 10/2024 | Wachsman ............. B60K 35/21 |

FOREIGN PATENT DOCUMENTS

| | | |
|---|---|---|
| JP | 2019-087015 A | 6/2019 |
| JP | 2020-003935 A | 1/2020 |
| JP | 2023-004438 A | 1/2023 |

* cited by examiner

*Primary Examiner* — Anne Marie Antonucci
*Assistant Examiner* — Luis G Del Valle
(74) *Attorney, Agent, or Firm* — SoraIP, Inc.

(57) ABSTRACT

The present disclosure provides a control system for an unmanned vehicle that does not require a driver or conductor on board. The control system calculates an index relating to the maintenance of the in-cabin environment on the basis of information of items related to the in-cabin environment of the vehicle, determines whether the index is equal to or greater than a threshold value, notifies a predetermined message using a notification device in the indoor of the vehicle when the index is less than the threshold value, and transmits a remote assistance request to a remote assistance terminal that performs remote assistance of the vehicle when the index is equal to or greater than the threshold value.

3 Claims, 5 Drawing Sheets

FIG. 3

| ITEMS RELATED TO THE MAINTENANCE OF IN-CABIN ENVIRONMENT | TYPE OF PARTICULAR SITUATION | SCORE |
|---|---|---|
| WHETHER OR NOT THERE ARE PASSENGERS WHO ENGAGE IN ACTS OF PUBLIC NUISANCE | SMOKERS | 4 |
|  | THERE IS A NOISY PERSON | 2 |
|  | PEOPLE WALKING AROUND | 1 |
|  | EATING AND DRINKING | 1 |
| LIGHTING LEVEL IN CABIN | TOO BRIGHT | 1 |
|  | TOO DARK | 1 |
| CABIN TEMPERATURE | TOO LOW | 2 |
|  | TOO HIGH | 2 |

CONTROL SYSTEM AND CONTROL METHOD FOR UNMANNED VEHICLE

CROSS-REFERENCE TO RELATED APPLICATION

This application claims priority to Japanese Patent Application No. 2023-184149 filed on Oct. 26, 2023, incorporated herein by reference in its entirety.

BACKGROUND

1. Technical Field

The present disclosure relates to a system and a method for controlling an unmanned vehicle that does not require a driver or conductor on board.

2. Description of Related Art

Japanese Unexamined Patent Application Publication No. 2019-087015 (JP 2019-087015 A) discloses technology related to remote monitoring of an autonomous driving vehicle. The autonomous driving vehicle includes autonomous sensors including at least a camera. When an obstruction is detected by the autonomous sensor, the autonomous driving vehicle is automatically stopped. When a transmitted signal is received from a remote monitoring center that remotely monitors the autonomous traveling vehicle after the automatic stop, traveling of the autonomous driving vehicle is resumed.

SUMMARY

Driverless vehicles that do not require a driver or a conductor to be on board are known. Providing passenger transportation services using driverless vehicles is conceivable. During provision of transportation services, there is a possibility that an in-cabin environment of the vehicle may not be appropriately maintained, such as acts of public nuisance being performed by a passenger. When a conductor is on board the vehicle, the conductor can deal with such a situation, but no conductor is constantly on duty in driverless vehicles. Further, although there are remote assistants standing by at locations outside the vehicle, in preparation for a situation that cannot be handled at the vehicle side, when remote assistance is requested every time a situation affecting maintenance of the in-cabin environment occurs, there is a possibility that a shortage of remote assistants will occur.

One object of the present disclosure is to provide technology for appropriately maintaining an in-cabin environment while reducing the load on remote assistants regarding a driverless vehicle.

The present disclosure provides a control system for an unmanned vehicle that does not require a driver or conductor on board. The control system according to the present disclosure includes one or more processors. The one or more processors calculate, based on information of an item relating to an in-cabin environment of the vehicle, an index relating to maintenance of the in-cabin environment, determine whether the index is no smaller than a threshold value, perform notification of a predetermined message using a notification device in a cabin of the vehicle when the index is smaller than the threshold value, and transmit a remote assistance request to a remote assistance terminal that performs remote assistance of the vehicle when the index is no smaller than the threshold value.

The present disclosure provides a control method for an unmanned vehicle that does not require a driver or conductor on board.

The control method according to the present disclosure includes calculating, based on information of an item relating to an in-cabin environment of the vehicle, an index relating to maintenance of the in-cabin environment, determining whether the index is no smaller than a threshold value, performing notification of a predetermined message using a notification device in a cabin of the vehicle when the index is smaller than the threshold value, and transmitting a remote assistance request to a remote assistance terminal that performs remote assistance of the vehicle when the index is no smaller than the threshold value.

According to the technology of the present disclosure, an index relating to maintenance of an in-cabin environment is calculated, and when the index is smaller than a threshold value, notification of a predetermined message is performed from a notification device to the cabin of a vehicle. Notification of the predetermined message may resolve a situation affecting maintenance of the in-cabin environment. On the other hand, when the index is no smaller than the threshold value, a remote assistance request is transmitted. Thus, appropriate measures can be taken in accordance with the index even though remote assistance is not required at all times.

As described above, according to the technology of the present disclosure, the frequency of requesting remote assistance can be reduced, while appropriately responding to situations affecting maintenance of the in-cabin environment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a table illustrating an example of information for calculating an index related to maintenance of an in-cabin environment;

DETAILED DESCRIPTION OF EMBODIMENTS

Embodiments of the present disclosure will be described with reference to the accompanying drawings.

1. Outline of Control System

Figure 1:
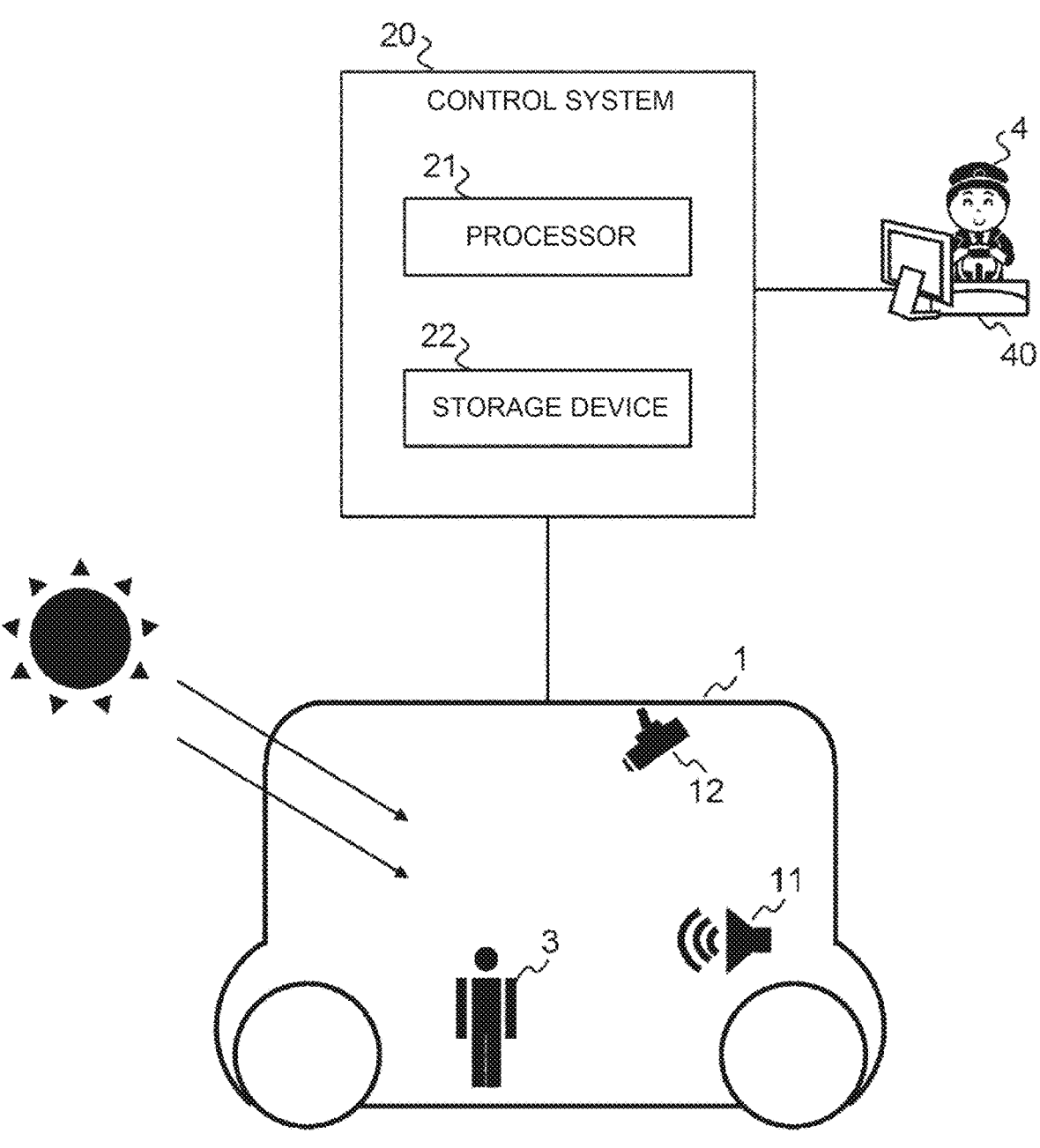
FIG. 1 is a conceptual diagram illustrating an example of a configuration of a control system according to the present embodiment.

FIG. 1 is a diagram illustrating an outline of a control system 20 according to the present embodiment. The control system 20 controls the vehicle 1. The vehicle 1 is a driverless vehicle capable of automatic driving. The driverless vehicle does not require the driver to drive the vehicle 1 or to ride a driver to monitor the operation of the vehicle 1. A driverless vehicle is also called an unmanned vehicle because a driver or a conductor is not on the vehicle.

The vehicle 1 is used to provide a mobile service to a user. For example, the vehicle 1 may be a vehicle used as a public transportation facility, a riding vehicle used by a plurality of users, or an unmanned taxi.

The control system 20 may be mounted on the vehicle 1. For example, the control system 20 may be configured by one or more ECU (Electronic Control Unit). Alternatively, the control system 20 may be mounted on an external device outside the vehicle 1. For example, the control system 20 may be part of a management server that manages the vehicle 1. Alternatively, the control system 20 may be distributed between the vehicle 1 and the external device.

The control system 20 comprises one or more processors 21 (hereinafter simply referred to as processors 21) and one or more storage devices 22 (hereinafter simply referred to as storage devices 22). The processor 21 executes various processes. For example, the processor 21 includes a CPU (Central Processing Unit). The storage device 22 stores various programs and various kinds of information. Examples of the storage device 22 include volatile memory, non-volatile memory, HDD (Hard Disk Drive), SSD (Solid State Drive), and the like.

The vehicle 1 is equipped with a notification device 11 and a sensor 12. The notification device 11 is a device that notifies the passenger 3 of the vehicle 1. In the example of FIG. 1, the notification device 11 is a speaker that notifies the passenger 3 by voice. As another example, the notification device 11 may be a display device that provides a visual notification to the passenger 3. The sensor 12 is a sensor that detects a situation inside the vehicle 1. In the example of FIG. 1, the sensor 12 is an in-vehicle camera that captures an image of the inside of the vehicle 1. As another example, the sensor 12 may be an odor sensor, an illuminance sensor, a temperature sensor, or the like. A plurality of notification devices 11 and sensors 12 may be provided. The control system 20 is configured to be able to communicate with the respective notification device 11 and the sensor 12.

The control system 20 is connected to one or more remote assistance terminals 40 via a communication network. The remote assistant 4 stands by at each remote assistance terminal 40. In a case where the vehicle 1 requires remote assistance, for example, in a case where the vehicle 1 is unable to make a determination regarding traveling by itself, a remote assistance request is issued from the control system 20, and the assigned remote assistant 4 operates the remote assistance terminal 40 to perform remote assistance.

Here, the in-cabin environment of the vehicle 1 will be considered. The in-cabin environment is an important factor for the passenger 3 using the mobile service, and it is desirable that the in-cabin environment is maintained at a certain level or higher. Hereinafter, in the present specification, a situation that hinders the maintenance of the in-cabin environment, that is, a situation that affects the in-cabin environment and may impair the comfort of the passenger 3 is referred to as a specific situation. For example, it is assumed that a specific situation is a situation in which the inside the cabin is too bright, a situation in which inside the cabin is too dark, a situation in which an unpleasant smell is generated for the passenger 3, a situation in which the temperature in the indoor space is too low, a situation in which an act of public nuisance is generated by some passengers, or the like. Examples of acts of public nuisance by passengers include smoking in the cabins of non-smoking vehicles, making a loud noise, walking around the cabins more than necessary, eating and drinking in the cabins prohibited from eating and drinking.

For example, in the example of FIG. 1, the west day is inserted into the cabin of the vehicle 1, and the passenger 3 feels dazzling. If the conductor is permanently resident in the vehicle 1, the conductor can be noticed and dealt with even if a specific situation occurs. For example, in a case where the cabin becomes excessively bright as shown in FIG. 1, the conductor that has noticed that the interior becomes excessively bright closes the curtain, so that the in-cabin environment can be maintained in a comfortable state again. However, in the case of an unmanned vehicle, the conductor is not necessarily in the vehicle 1.

As a countermeasure in a case where a specific situation occurs, it is conceivable to improve the situation by remote assistance, that is, the remote assistant 4 plays a role of a conductor. For example, when the sensor 12 (illuminance sensor) detects that the cabin is excessively bright, it is conceivable to transmit a remote assistance request from the vehicle 1 and request a response by the remote assistant 4. Upon receiving the remote assistance request, the remote assistant 4 confirms that the cabin is in a glare state from the image of the sensor 12 (in-vehicle camera), and can respond to the situation by closing the curtain in the cabin by operating the remote assistance terminal 40.

However, in the remote assistance of the vehicle 1, one remote assistant 4 often takes charge of a plurality of vehicles 1, and if a remote assistance request is transmitted from each of the plurality of vehicles 1 at a high frequency, the number of remote assistants 4 may be insufficient. In particular, the remote assistant 4 is also in charge of remote assistance related to the travel of the vehicle 1. It is undesirable for remote assistance to serve as a conductor to squeeze resources for more needed remote assistance, such as assistance in driving. Therefore, when a specific situation is detected, the control system 20 first makes a determination as to whether the detected specific situation is a highly urgent situation. Then, different countermeasures are selected depending on the degree of urgency.

2. Example of Processing

Figure 2:
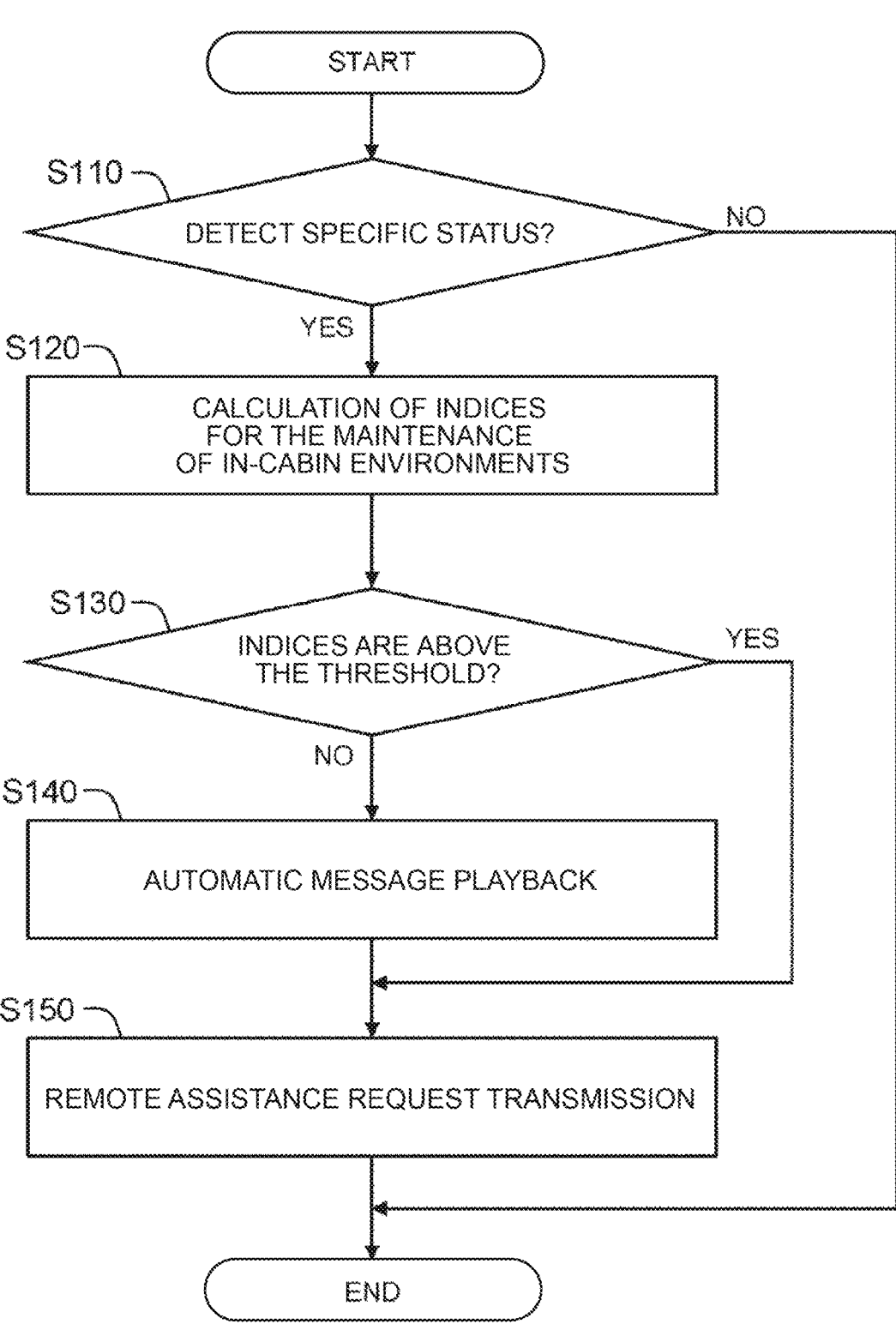
FIG. 2 is a flowchart illustrating an example of processing by the control system.

FIG. 2 is a flowchart illustrating an example of processing performed by the control system 20. The processing represented by the flowchart of FIG. 2 is realized, for example, by the processor 21 executing a program stored in the storage device 22. This series of processes is repeatedly executed at predetermined control cycles.

In S110, the processor 21 determines whether a particular condition has been detected. If a particular condition has been detected (S110; Yes), the process proceeds to S120. If no particular condition has been detected (S110; No), the process ends.

The processor 21 may detect a specific situation based on information obtained from the sensor 12. For example, the processor 21 can detect a situation in which the cabin is excessively bright by image analysis of an image captured by the in-vehicle camera. Alternatively, such a situation may be detected by an illuminance sensor. As another example, the processor 21 may detect an odor generated in the cabin by the odor sensor. As yet another example, the processor 21 may detect that there is a passenger performing an act of public nuisance by image analysis of an image captured by the in-vehicle camera.

In S120, the processor 21 calculates an index related to the maintenance of the in-cabin environment. Once the index is calculated, the process proceeds to S130.

In the storage device 22, information for calculating an index related to the maintenance of the in-cabin environment is stored in advance. FIG. 3 is a table illustrating an example of information stored in the storage device 22 as information for calculating an index related to maintenance of an in-cabin environment.

In the example of FIG. 3, items related to the maintenance of the in-cabin environment are set, and a score according to the type of the specific situation is set for each item. The score is set in advance such that an item having a higher urgency level is higher and an item having a lower urgency level is lower. For example, if the cabin is dark, the passenger 3 may feel uncomfortable, but the score is set relatively low because it is not a situation in which the passenger 3 is damaged immediately. When there is a passenger who is smoking in a non-smoking vehicle, the score is set relatively high because there is a risk of causing health damage to the surrounding passengers. When the specific situation is detected, the control system 20 calculates an index based on these scores. For example, the total value of the scores corresponding to the specific situations detected within the predetermined time period is calculated as an index related to the maintenance of the in-cabin environment.

In S130, the processor 21 determines whether or not the index calculated by S120 is equal to or greater than a threshold. The threshold value is set in advance and stored in the storage device 22. If the index is less than the threshold (S130; No), the process proceeds to S140. On the other hand, if the index is greater than or equal to the threshold (S130; Yes), the process proceeds to S150.

In S140, the processor 21 plays back an automated message using the notification device 11. The automatic message is set in advance according to the type of the specific situation. For example, if the cabin is too bright, the sun is dazzling. Be careful. "A message may be set.

In S150, the processor 21 transmits a remote assistance request to the remote assistance terminal 40. Upon receiving the remote assistance request, the remote assistant 4 operates the remote assistance terminal 40 to perform remote assistance for resolving the specific situation. When the remote assistance request is transmitted, the series of processing ends.

The effects of the series of processes will be described by way of example. For example, even when the cabin becomes dazzled due to the insertion of the day, the position and attitude of the vehicle 1 may be changed immediately. In such a case, since the index concerning the maintenance of the in-cabin environment is small, the notification from the passenger 3 about the occurrence of the specific situation is urged by the reproduction of the automatic message (for example, "If there is any inconvenience during the boarding, please let me know from your terminal."). In a case where such a situation is not solved within a predetermined time, since a specific situation is detected a plurality of times within a predetermined time, the scores are summed to increase the index. In such a case, remote assistance is required, and operations such as closing the curtain by the remote assistant 4 are performed, so that the situation can be appropriately dealt with. In addition, when a specific situation in which a score is set to be large is detected, an index related to the maintenance of the in-cabin environment also increases. Since such a situation is considered to be a highly urgent situation, even if it is detected only once, a remote assistance request is transmitted.

As described above, according to the control system 20, by calculating the index using the score, it is possible to separate a situation in which remote assistance is required and a situation in which it is possible to cope with an automatic message. In situations where the index for the maintenance of the in-cabin environment is small and the urgency is low, an automatic message is played instead of requesting remote assistance. As a result, it is possible to reduce the frequency at which the remote assistance request is transmitted and prevent the shortage of the remote assistant 4. In addition, in a case where the index regarding the maintenance of the in-cabin environment is large and the degree of urgency is high, remote assistance is required, and therefore, it is possible to appropriately cope with a specific situation in which the degree of urgency is high.

3. Internal Notification By Passengers 3-1. Internal Reporting of Act of Public Nuisance In the above example, the control system 20 detects a specific situation by acquiring information from the sensor 12. However, the detection of the specific situation may be performed based on an internal notification from the passenger 3. The internal notification from the passenger 3 is made through the user terminal. The user terminal is a mobile communication terminal owned by the passenger 3. Each user terminal is configured to be able to communicate with the control system 20. The passenger 3 can use any communication terminal as the user terminal. For example, an application may be installed in a mobile communication terminal such as a smart phone, a smart watch, a tablet, or the like to be usable as a user terminal.

Figure 4:
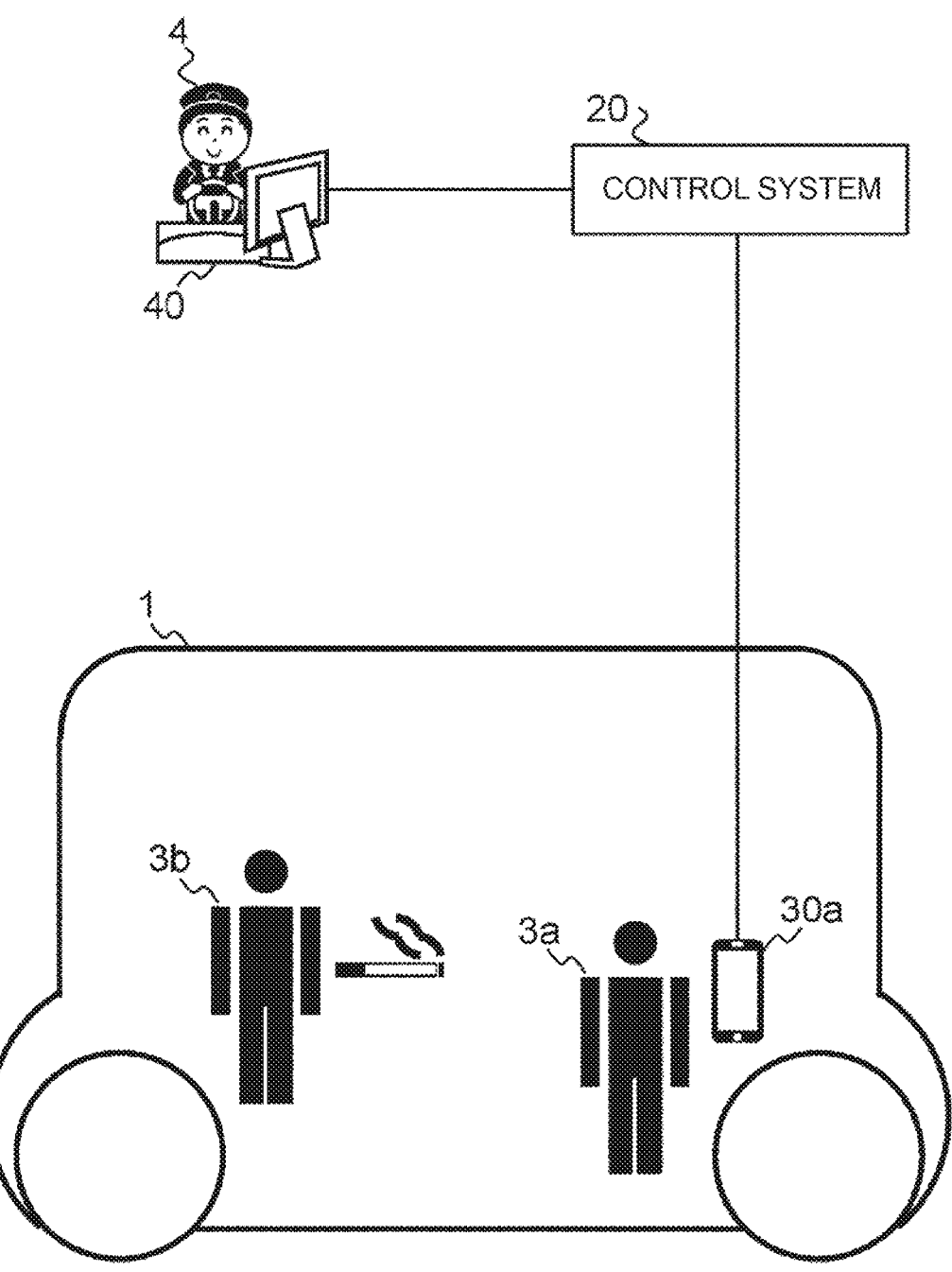
FIG. 4 is a diagram for describing a modification.

Here, as an example, a case will be considered where the specific situation is a situation in which an act of public nuisance is performed by a passenger. FIG. 4 shows a situation in which a plurality of passenger 3a and 3b are on board the vehicle 1. Although the vehicle 1 is a non-smoking vehicle, the passenger 3b is smoking in the cabin of the vehicle 1. A passenger 3a that has noticed an act of public nuisance (here, a smoking action) caused by a passenger 3b makes an in-house notification to the control system 20 through a user terminal 30a owned by the passenger.

For example, the passenger 3a launches an application installed in the user terminal 30a, and enters a message indicating that it is desired to make an in-house notification. The application may be provided with information for identifying the passenger 3b who is performing an act of public nuisance, in addition to the request for an in-house notification. The information for identifying the passenger 3b may not necessarily be information specifying the passenger 3b as a pinpoint. For example, it may be selected which area the passenger 3b is in when the vehicle 1 is divided into several areas. A vehicle number in which the passenger 3b is located may be entered. Alternatively, the control system 20 may acquire an image of the in-vehicle camera in response to a request for an in-vehicle notification from the passenger 3a, and display the image on the user terminal 30a through the application. The passenger 3a may then be asked to point the passenger 3b from the images. The passenger 3a may specify a passenger 3b, such as by enclosing a passenger 3b on an application. Alternatively, the control system 20 may extract a candidate person from the images of the in-vehicle cameras and ask the passenger 3a to select 3b of passengers who are performing the act of public nuisance from the extracted persons. As a further alternative, the control system 20 may identify 3b of passengers performing the act of public nuisance by image-analysis of the images acquired from the in-vehicle camera.

Upon receiving the internal notification, the control system 20 calculates an index related to the maintenance of the in-cabin environment, and requests the reproduction of the automatic message or the remote assistance according to the size of the index.

Indices for in-cabin environmental maintenance can be calculated using scoring as in S120 of FIG. 2. First, the processor 21 identifies an act of public nuisance that hinders the maintenance of the in-cabin environment based on the internal notification. Next, a score corresponding to the identified act of public nuisance is acquired. Then, the scores acquired within a certain period of time are summed and calculated as an index related to the maintenance of the in-cabin environment. When there is a plurality of passengers 3 who have made the internal notification, the scores obtained by the internal notification are summed. That is, when there is an internal notification regarding an act of public nuisance with a high degree of urgency, or when there is an internal notification from a plurality of passengers 3, the index regarding the maintenance of the in-cabin environment becomes large, and it is determined that the degree of urgency is high. In such a case, the remote assistance request is immediately transmitted to the remote assistance terminal 40.

For example, a case where the threshold value is set to 4 will be considered. If there is an internal notification that there is a smoker in the vehicle, the index is 4 and is equal to or greater than the threshold value, so that a remote assistance request is immediately transmitted. If there is an internal notification that there is a noisy person in the vehicle from one person, since the index is less than the threshold by 2, the automatic message is played back first. Even if there is an internal notification that there is a noisy person in the vehicle in the same way, if there is a notification from the two persons, the index becomes four, and therefore the remote assistance request is immediately transmitted.

When a specific situation is detected on the basis of the internal notification by the passenger 3, the specific situation means that the passenger 3 actually feels that he/she wants to solve the situation. Therefore, it is possible to detect a specific situation in a more realistic manner. Further, since the user terminal carried by the passenger 3 can be used, it is possible to make an internal notification without worrying that the passenger is known to the passenger who is performing the act of public nuisance. In addition, when there is an internal notification from the plurality of passengers 3, the scores are added together, and an index is calculated so as to represent a situation in which the urgency is higher. Accordingly, it is possible to select a response based on the reproduction of the automatic message or the remote assistance in accordance with the situation.

3-2. Multiple Messages

Figure 5:
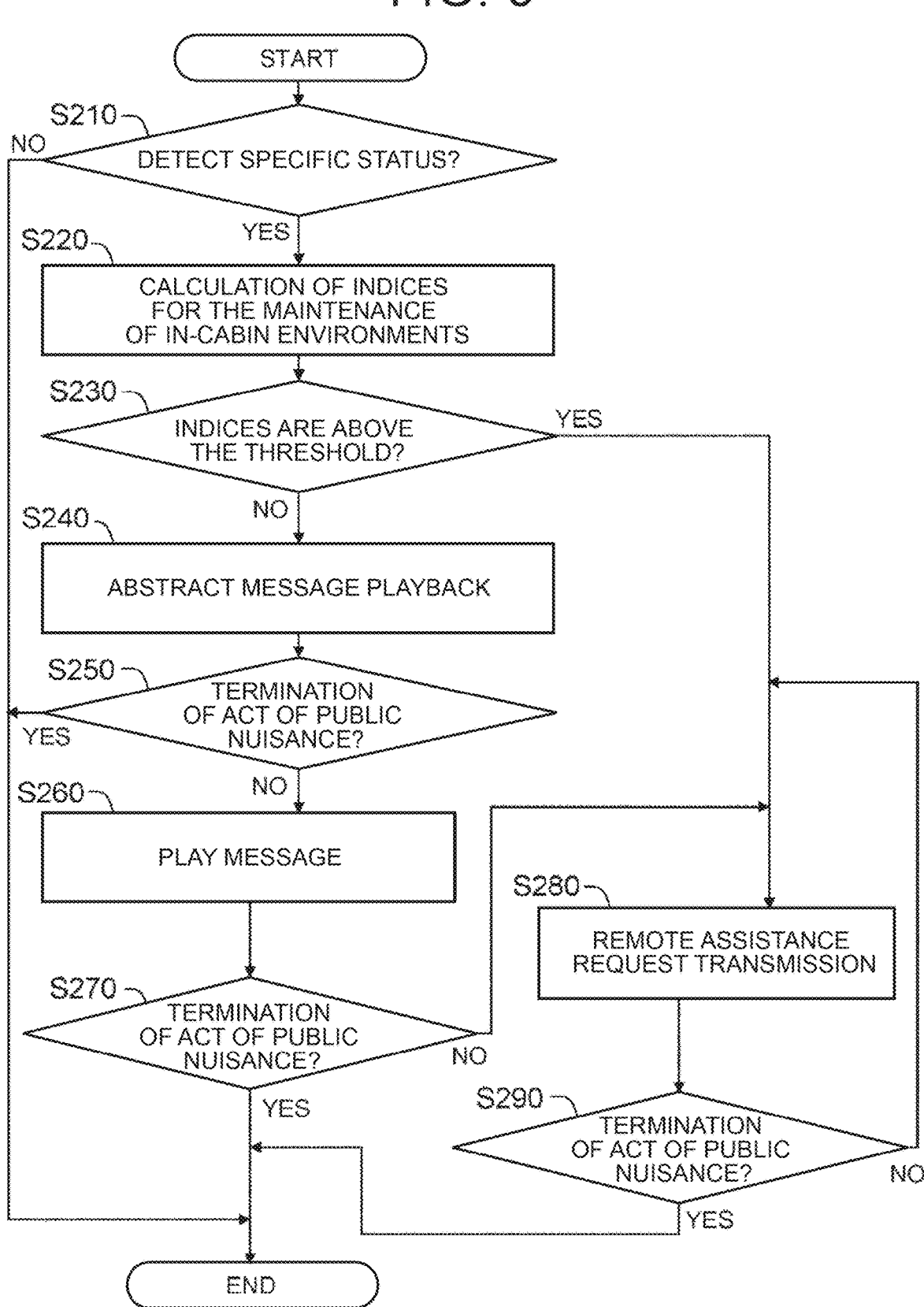
FIG. 5 is a flowchart illustrating an example of processing in the modification.

In a case where an internal notification is made from the passenger 3 in response to an act of public nuisance, the following modification is possible. FIG. 5 is a flowchart illustrating an example of processing performed by the processor 21 in this modification.

In S230 from S210, the same process as S130 is performed from S110 of FIG. 3. If the index is less than the thresholds in S230, the process proceeds to S240.

In S240, the auto-message is played back in the same way as in S140 of FIG. 3. Here, however, an "abstract message" is played. The abstract message is a message corresponding to two or more items indicating the type of the act of public nuisance. For example, a message "Please let me know if you have any act of public nuisance" is set as an abstract message. By first sending an abstract message as an automatic message, it is possible to remind the whole of the passenger without suddenly stimulating the passenger who is performing the act of public nuisance.

In S250, the processor 21 determines whether or not the act of public nuisance has ended. Whether or not the act of public nuisance has been completed can be determined by image analysis of an image captured by the in-vehicle camera. As another example, did the passenger terminal 30 "complete the act of public nuisance? A message may be sent and a determination may be made based on the answer from passenger 3. If the act of public nuisance has ended (S250; Yes), the process ends. On the other hand, if the act of public nuisance has not ended (S250; No), the process proceeds to S260.

In S260, the processor 21 reproduces the auto-message again. However, unlike S240, a "specific message" is played back here. The specific message is a message set in accordance with the type of the act of public nuisance. For example, in a case where the act of public nuisance is an act of noisy in the cabin, a message "please do not noisy in the vehicle" is reproduced as a specific message. By playing back the specific message, it is possible to clearly remind the passenger. When the specific message is played back, the process proceeds to S270.

In S270, the processor 21 determines whether the passenger's act of public nuisance has ended. The determination methods are the same as those of S250. When the passenger's act of public nuisance is completed (S270; Yes), the series of processes ends. If the act of public nuisance by the passenger has not been completed (S270; No), the process proceeds to S280.

In S280, the processor 21 transmits a remote assistance request to the remote assistance terminal 40. Upon receiving the remote assistance request, the remote assistant 4 transmits an announcement corresponding to the individual situation to deal with the act of public nuisance. At this time, the remote assistant 4 may make an announcement to clearly identify a passenger who is performing an act of public nuisance, such as "a person wearing green clothes", or "please do not make a noise in the vehicle."

In S290, the processor 21 determines whether or not the act of public nuisance has ended. The determination may be performed in the same manner as S250. Alternatively, the determination may be performed by the remote assistant 4 determining whether or not the act of public nuisance has ended based on the image of the in-vehicle camera, and acquiring the determination result input by the remote assistant 4. When the passenger's act of public nuisance is completed (S290; Yes), the series of processes ends. If the passenger's act of public nuisance has not ended (S290; No), the process returns to S280 and a remote assistance demand is sent back.

Thus, in this variation, the automatic message includes two types of messages: an abstract message and a specific message. An abstract message is played in preference to a specific message. Encourage passengers who are engaged in act of public nuisance to be cautious at first. If the passenger is still unable to stop the act of public nuisance, the message is shifted to a specific message corresponding to the individual situation. As a result, it is possible to appropriately urge the passenger to pay attention while avoiding sudden stimulation of the passenger performing the act of public nuisance.

The same applies to the present modification in that the index regarding the maintenance of the in-cabin environment is large, that is, in a situation where the urgency is high, remote assistance is required. While reducing the frequency with which the remote assistance request is transmitted and reducing the burden on the remote assistant 4, it is possible to request the remote assistance in a necessary situation and request an appropriate response by the remote assistant 4.

4. Effect

As described above, according to the control system of the present embodiment, it is not necessary to rely on remote assistance at all times even when a situation that hinders the maintenance of the in-cabin environment occurs. Appropriate measures can be taken to resolve this situation while reducing the burden on remote assistants.

What is claimed is:

1. A control system comprising:

an unmanned vehicle that does not require a driver or conductor on board, the unmanned vehicle including a camera and a notification device, a remote assistance terminal configured to perform remote assistance for the unmanned vehicle, and a processor configured to communicate with the camera, the notification device, and the remote assistance terminal via a network, wherein the camera is configured to capture an image of an interior cabin of the unmanned vehicle, and the processor is configured to:

calculate, based on information of an item relating to an in-cabin environment of the unmanned vehicle, an index relating to maintenance of the in-cabin environment, the item relating to the in-cabin environment including a score corresponding to an act of public nuisance, the act of public nuisance obstructing maintenance of the in-cabin environment, identify the act of public nuisance based on the captured image, determine the score corresponding to the act of public nuisance, calculate the index based on a value of the score corresponding to the act of public nuisance identified within a predetermined time period, determine whether the index is smaller than a threshold value, output a notification of a predetermined message via the notification device to cause the act of public nuisance to end in a case where the index is smaller than the threshold value, and transmit a request for the remote assistance to the remote assistance terminal in a case where the index is equal to or greater than the threshold value, the remote assistance being performed via the remote assistance terminal to cause an announcement to be output to a person who is performing the act of public nuisance.

2. The control system according to claim 1, wherein:

information of the item relating to the in-cabin environment is obtained from an internal notification, the internal notification being transmitted from a mobile terminal of a passenger on board the unmanned vehicle; and the processor is further configured to identify the act of public nuisance based on the internal notification.

3. The control system according to claim 2, wherein:

the item relating to the in-cabin environment includes a plurality of items;

the predetermined message includes a specific message that corresponds to each item of the plurality of items, and an abstract message that includes at least two items of the plurality of items; and the processor is configured to output a notification of the abstract message prior to a notification of the specific message in a case where the index is smaller than the threshold value.

* * * * *